US009824151B2

United States Patent
Freund et al.

(10) Patent No.: US 9,824,151 B2
(45) Date of Patent: Nov. 21, 2017

(54) PROVIDING A PORTION OF REQUESTED DATA BASED UPON HISTORICAL USER INTERACTION WITH THE DATA

(71) Applicant: GOOGLE INC., Mountain View, CA (US)

(72) Inventors: Martin Brandt Freund, Mountain View, CA (US); Momchil Filev, Mountain View, CA (US)

(73) Assignee: Google Inc., Mountain View, CA (US)

( * ) Notice: Subject to any disclaimer, the term of this patent is extended or adjusted under 35 U.S.C. 154(b) by 521 days.

(21) Appl. No.: 13/728,906

(22) Filed: Dec. 27, 2012

(65) Prior Publication Data

US 2015/0205887 A1    Jul. 23, 2015

(51) Int. Cl.
*G06F 17/30* (2006.01)

(52) U.S. Cl.
CPC .. *G06F 17/30867* (2013.01); *G06F 17/30899* (2013.01)

(58) Field of Classification Search
CPC ................ G06F 3/04855; G06F 17/30905
See application file for complete search history.

(56) References Cited

U.S. PATENT DOCUMENTS

| | | | |
|---|---|---|---|
| 2007/0208730 A1* | 9/2007 | Agichtein et al. | 707/5 |
| 2008/0133475 A1* | 6/2008 | Fischer | 707/3 |
| 2008/0294694 A1* | 11/2008 | Maghfourian et al. | 707/104.1 |
| 2011/0022945 A1* | 1/2011 | Yang | G06F 17/30899 715/234 |
| 2011/0218961 A1* | 9/2011 | Johnson et al. | 707/609 |
| 2012/0072835 A1* | 3/2012 | Gross et al. | 715/243 |
| 2012/0144288 A1* | 6/2012 | Caruso | G06F 17/30905 715/234 |
| 2012/0239519 A1* | 9/2012 | Wu et al. | 705/26.3 |
| 2013/0246926 A1* | 9/2013 | Vemireddy | G06F 17/30867 715/738 |
| 2014/0059156 A1* | 2/2014 | Freeman et al. | 709/213 |

\* cited by examiner

*Primary Examiner* — Sangwoo Ahn
(74) *Attorney, Agent, or Firm* — McDermott Will & Emery LLP

(57) ABSTRACT

The disclosed subject matter relates to providing a portion of data based on historical user interaction with the data. In one aspect, a method includes receiving a request for a webpage corresponding to a search query. The method further includes selecting a portion of the requested webpage based on historical data. The historical data includes user interactions with the webpage subsequent to previous search queries. The method further includes providing the selected portion of the requested webpage, in response to the received request.

17 Claims, 10 Drawing Sheets

400A

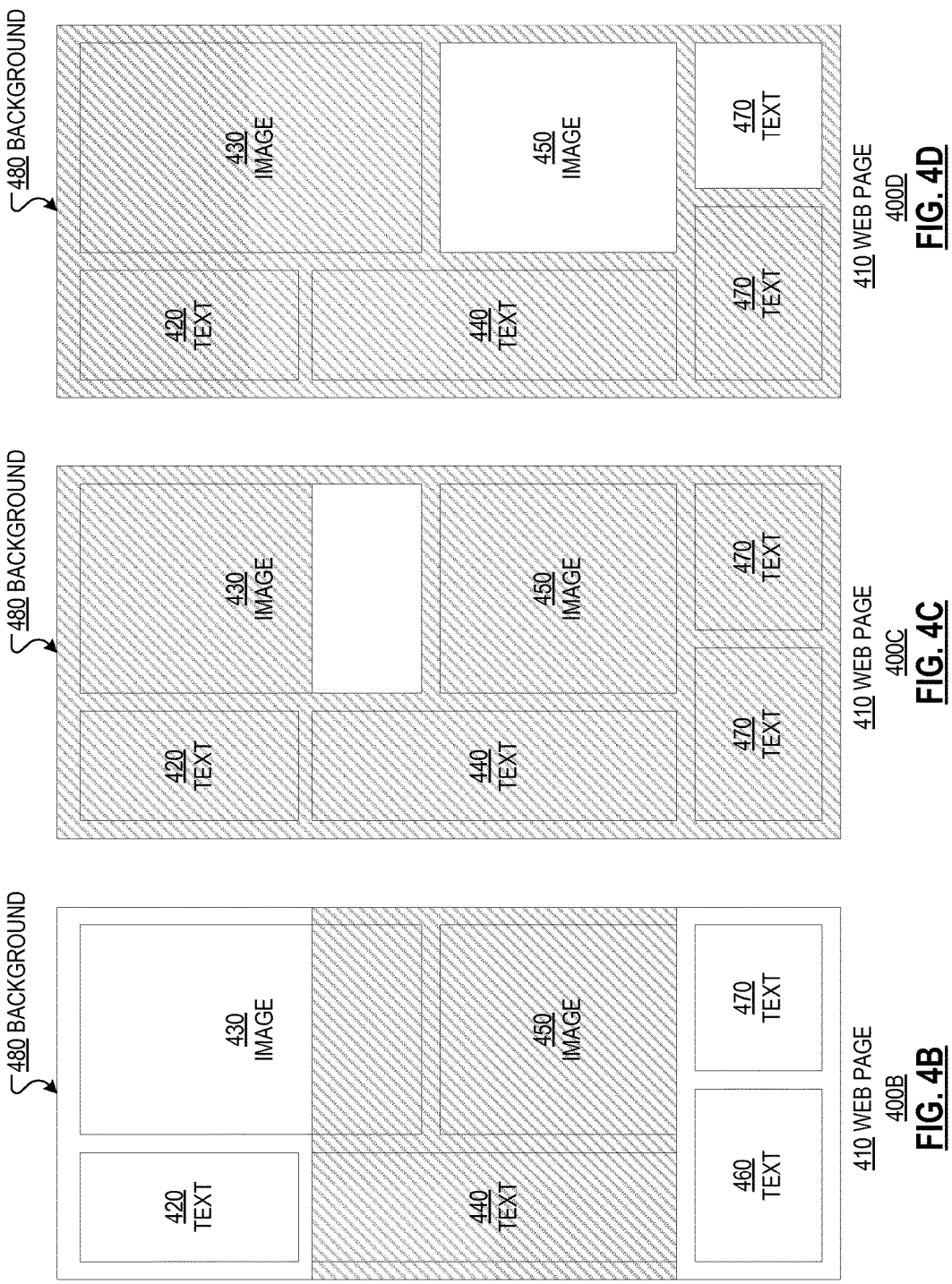

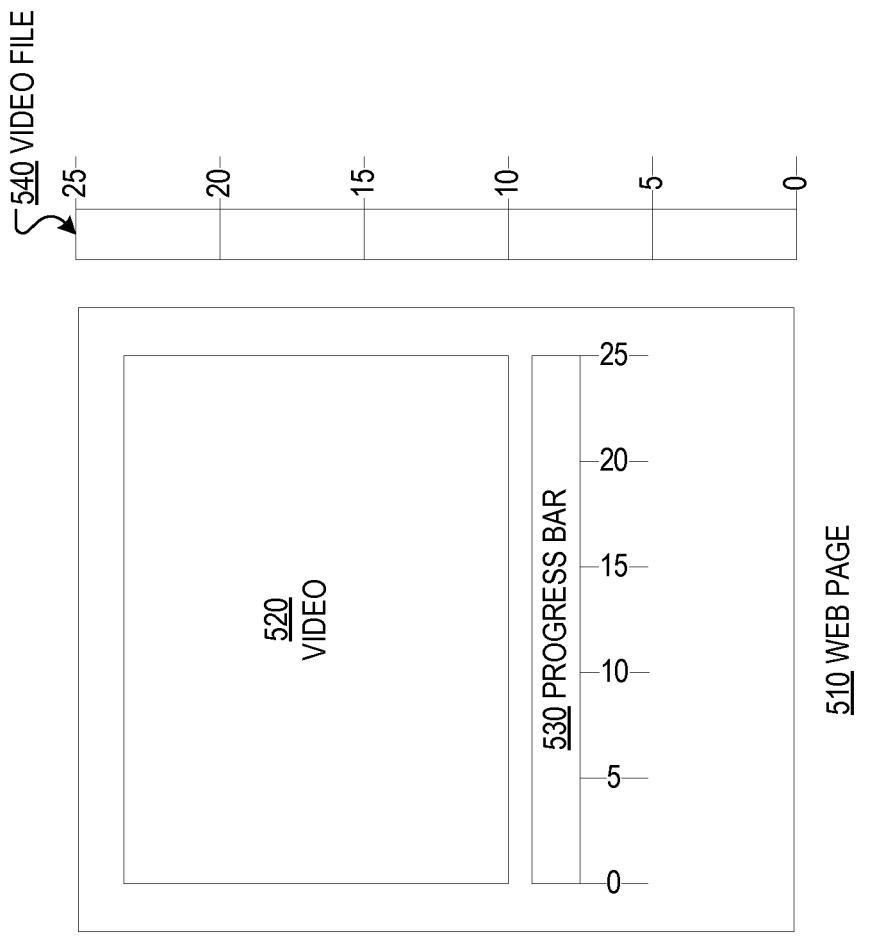

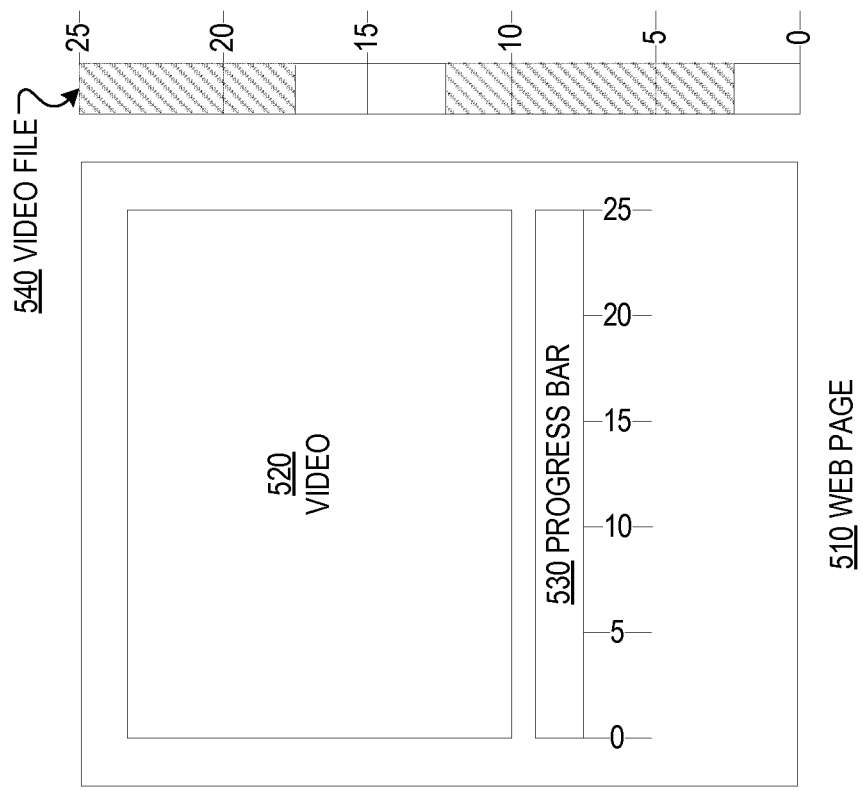
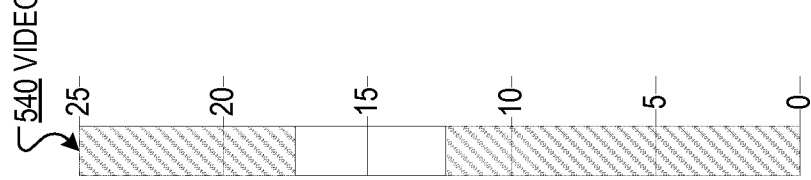
FIG. 5C
500C
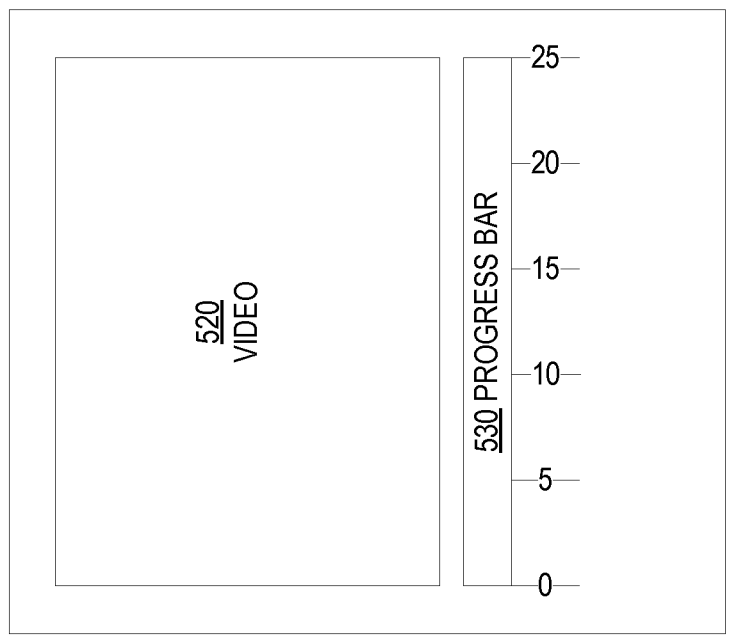
FIG. 5B
500B

PROVIDING A PORTION OF REQUESTED DATA BASED UPON HISTORICAL USER INTERACTION WITH THE DATA

BACKGROUND

Some users browse directly to their favorite websites. Other users use Internet search engines to find webpages and content related to their search queries. Users may not be interested in the entirety of the content they request, webpages they browse to, or find through an Internet search. However, data is often served by servers, and consequently displayed by client computing devices sequentially, and in its entirety.

SUMMARY

The disclosed subject matter relates to a computer-implemented method for providing search results. The method includes receiving a request for a webpage corresponding to a search query. The requested webpage comprises a plurality of webpage elements. At least one of the plurality of webpage elements is a user-perceivable webpage element. The method further includes selecting a portion of the requested webpage based on historical data. The historical data includes user interactions with the webpage subsequent to previous search queries. The selected portion of the requested webpage comprises at least one of the plurality of webpage elements. The method further includes providing the selected portion of the requested webpage, in response to the received request.

The disclosed subject matter further relates to a machine-readable storage medium including machine-readable instructions for causing a processor to execute a method for providing a user-perceivable content item. The method includes receiving a request for a user-perceivable content item. The method further includes selecting a portion of the requested user-perceivable content item based on historical data. The historical data includes user interactions with the requested user-perceivable content item subsequent to previous requests. The method further includes providing the selected portion of the requested user-perceivable content item, in response to the received request.

The disclosed subject matter further relates to a system for rendering a webpage corresponding to a search result. The system includes a memory which includes instructions for rendering a webpage corresponding to a search result, and a processor. The processor is configured to receive a search landing page from a server, in response to a search query. The received search landing page includes a search result which corresponds to a webpage. The webpage includes a plurality of webpage elements. The received search landing page includes an identification information of at least one of the plurality of webpage elements. The webpage element(s) are identified based on historical data including user interactions with the webpage subsequent to previous search queries. The processor is further configured to generate a request for the identified webpage element(s) based on the identification information. The identified webpage element(s) is a user-perceivable webpage element. The processor is further configured to render, based on the generated request, a portion of the received webpage corresponding to the identified webpage element(s).

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

FIGS. 4A-D illustrate examples of how a portion of webpage can be selected.

FIGS. 5A-C illustrate examples of how a portion of video can be selected.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, the subject technology is not limited to the specific details set forth herein and may be practiced without these specific details. In some instances, structures and components are shown in block diagram form in order to avoid obscuring the concepts of the subject technology.

When a user performs an Internet search using a search query, a search landing page is provided, which includes search results corresponding to the search query. The user can then select one of the search results, and access the webpage corresponding to the search result.

When the user selects the search result, the corresponding webpage is typically provided in its entirety, even though the user may be interested in only a portion thereof. If the user's network connection is slow, or if the webpage is large or poorly designed, a significant amount of time can be required to receive (e.g., download) and render the entire webpage. Such delays can degrade a user's computing experience.

A user's computing experience can be similarly degraded when the user is interested in a specific portion of a content item but the content item is provided in its entirety for the user. The term "content item" as used herein encompasses its plain and ordinary meaning, including, but not limited to user-perceivable content including text, sound, image, or video data.

In one aspect, the subject technology described herein relates to selecting and providing a portion of a requested webpage based on historical data regarding user interactions with the webpage subsequent to previous search queries. In another aspect, the subject technology described herein relates to selecting and providing a portion of a content item based on historical data regarding user interactions with the content item. In yet another aspect, the subject technology described herein relates to identifying elements of a webpage, based on historical data regarding user interactions with the webpage, such that the identified webpage element(s) can be requested by, and rendered on a client computing device.

Figure 1:
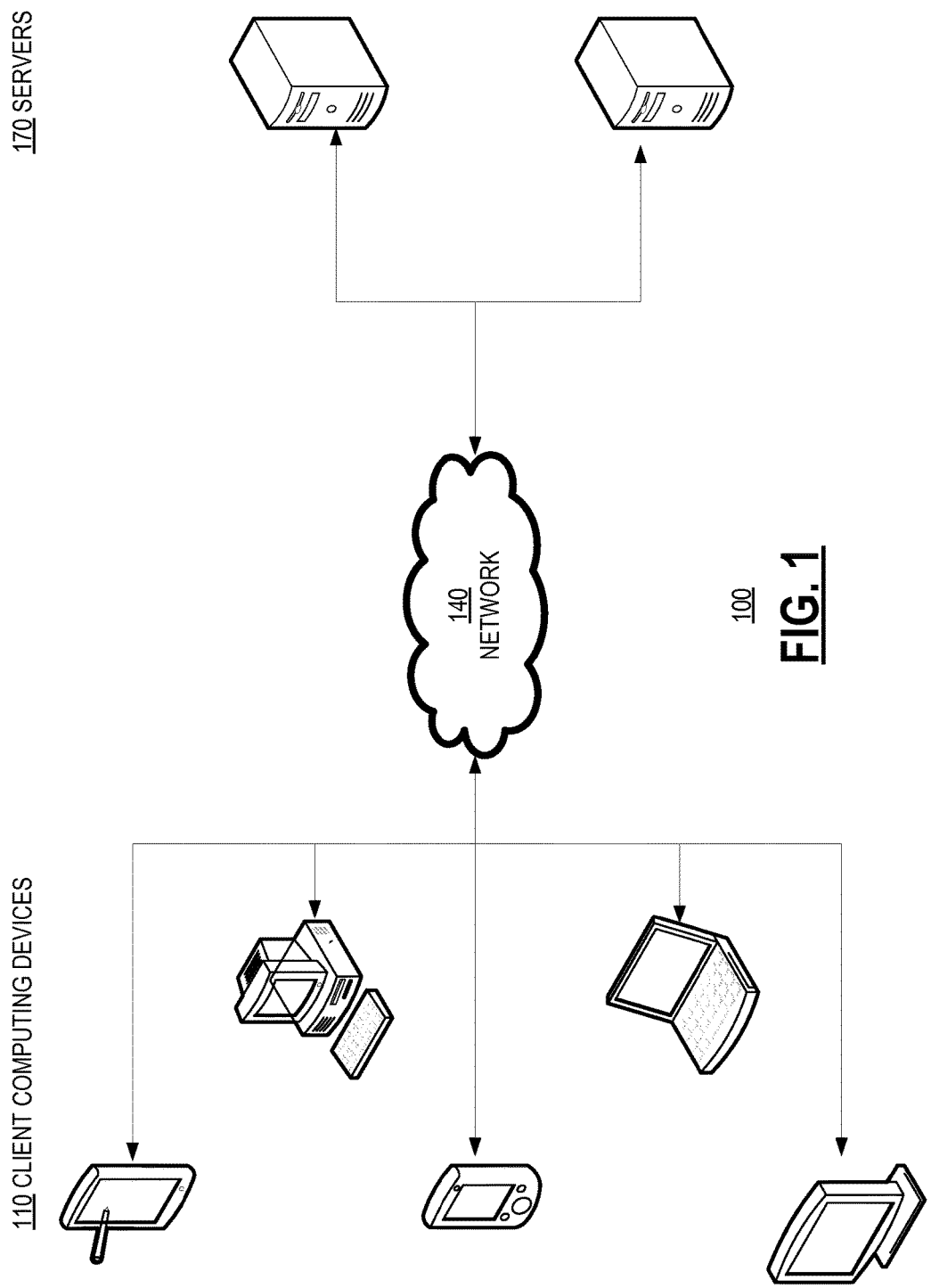
FIG. 1 illustrates an example of an architecture for providing a portion of requested data based on historical user interaction with the data.

FIG. 1 illustrates an example of an architecture 100 for providing a portion of requested data based on historical user interaction with the data. The architecture 100 includes client computing devices 110 and servers 170 connected over a network 140.

The client computing devices 110 can be, for example, mobile computers, tablet computers, mobile devices (e.g., a smartphone or PDA), desktop computers, set top boxes (e.g., for a television), video game consoles, or any other devices having processing capabilities, communications capabilities, and memory.

The network 140 can include any one or more of the Internet, a personal area network (PAN), a local area network (LAN), a campus area network (CAN), a metropolitan area network (MAN), a wide area network (WAN), a broadband network (BBN), and the like. Further, the network 140 can include, but is not limited to, any one or more of the following network topologies, including a bus network, a star network, a ring network, a mesh network, a star-bus network, tree or hierarchical network, and the like.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

Figure 2:
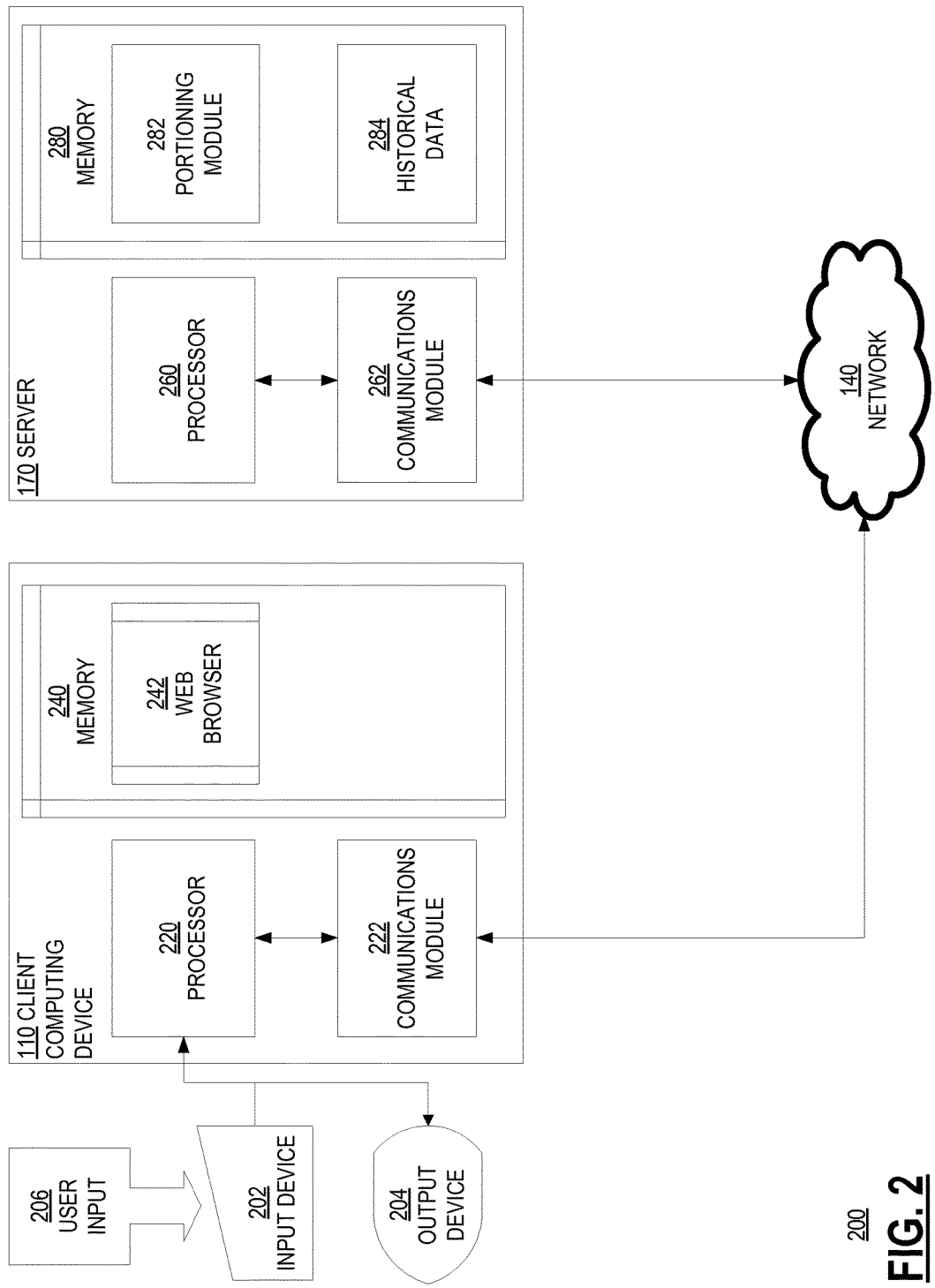
FIG. 2 is a block diagram illustrating an example of a client computing device and a server from the architecture of FIG. 1.

FIG. 2 is a block diagram 200 illustrating an example of a client computing device 110 and a server 170 in the architecture 100 of FIG. 1 according to certain aspects of the disclosure.

The server 170 is connected to the network 140 via a communications module 262. The communications module 262 is configured to interface with the network 140 to send and receive information, such as data, requests, responses, and commands to other devices on the network 140. The communications module 262 can be, for example, a modem or an Ethernet card.

The server 170 includes a memory 280, a processor 260, and a communications module 262. The memory 280 includes software instructions that can be read by the processor 260 to implement a portioning module 282. The processor 260 of the server 170 is configured to execute instructions, such as instructions physically coded into the processor 260, instructions read from the memory 280 such as the portioning module 282, or a combination of both. In one implementation, the processor 260 executes the portioning module 282 to provide a portion of requested data based on historical data 284 of the user's interaction with the requested data.

The historical data 284 includes records (e.g., logs) of historical user interaction with requested data. The requested data can be a webpage, which can have a number of webpage elements therein. The data can also be a content item, such as a video, an audio recording, an image, or text-based data.

User interactions are stored as historical data 284 based on information received or collected from a number of sources. For example, when a user performs a web search, the user's search query can be received from a server providing the search services. As another example, when the user clicks or otherwise selects a particular search result within a search landing page, the user's selection can be received from a name server providing the DNS services. User interactions can also include client-side events, which are described in more detail below with reference to the client computing device 110.

It should be noted that while in the implementation of FIG. 2, the historical data 284 is stored in the memory 280 of the server, in other implementations, the historical data 284 may be stored in a memory external to the server 170, for example, as a database.

The client computing device 110 includes an input device 202, an output device 204, a processor 220, a communications module 222, and memory 240. The input device 202 can be a touchscreen, a mouse, a keyboard, an audio input device (e.g., a microphone), a video input device (e.g., a camera, a motion detector), or any other device to enable a user to supply input 206 to the client computing device 110. The output device 204 can be a display screen. Input 206 received via the input device 202 can be processed locally on the client computing device 110 and/or the server 170.

The client computing device 110 is connected to the network 140 via a communications module 222. The communications module 222 is configured to interface with the network 140 to send and receive information, such as data, requests, responses, and commands to other devices on the network 140. The communications module 222 can be, for example, a modem or an Ethernet card.

An application or an operating system may be stored in the memory 240 of the client computing device 110. In the implementation illustrated in FIG. 2, the memory 240 includes a web browser 242. However, the subject technology described herein may be utilized by any application or operating system capable of requesting data.

A user can use an input device 202 to provide user input(s) 206 for interacting with a webpage or a content item, through the web browser 242. For example, the user's interaction with a webpage can include scrolling to, clicking on, selecting, highlighting, copying, or saving a certain part of the webpage. The amount of time for which the webpage, or a certain part thereof, are displayed within the web browser 242 can also be stored as historical data 284.

The various types of user interaction can be broadly classified as positive user interaction and negative user interaction. For example, in a case where the user submits a search query, selects a search result from the search landing page, and then spends a certain amount of time on the webpage corresponding to the search result, the user's interaction can be considered positive. The positive interaction can be associated with the webpage as a whole, or a specific portion of the webpage viewed by the user, with respect to the search query that resulted in the search result being provided as part of the search landing page.

As another example, in a case where the user immediately browses away from the webpage, the user's interaction can be considered a negative interaction. The negative interaction can be associated with the webpage as a whole, or the specific portion of the webpage viewed by the user prior to browsing away from the webpage.

When the data in question is a content item, such as a video or an audio file, the positive and negative user interactions can be defined in the context of the content item. For example, if the user replays a certain portion of the video or audio, the user's interaction with that portion of the video or audio can be considered positive. Similarly, if the user skips, or fast forwards through a certain portion of the video or audio, the user's interaction with that portion can be considered negative.

User interactions of a number of users, with particular data, can be aggregated and stored as historical data 284. When a subsequent user requests the same data, the server 170 can provide first, the portions of data that have the most positive interactions associated therewith. The server 170 can then optionally provide additional portions of that data which have fewer positive interactions (or more negative interactions) associated therewith. Using such an approach, the server 170 can provide the portions of data that users have historically been most interested in within the context of a particular search query or data request.

The subject technology can also be used to enable an application, such as a web browser 242, to request and render portions of data that users have historically been most interested in within the context of a particular search query or data request.

For example, in one implementation, the web browser 242 can receive a search landing page from the server 170 in response to a search query. The received search landing page can have a number of search results corresponding to various webpages. Each of the webpages can have a number of webpage elements. The received search landing page can include information identifying the specific webpage elements in each of the webpages that users have historically been most interested in. When the user clicks on a search result, the web browser 242 can request the specific webpage elements based on the identification information provided as part of the received search landing page. The requested webpage elements can then be received and rendered by the web browser 242 for display on the output device 204.

Figure 3A:
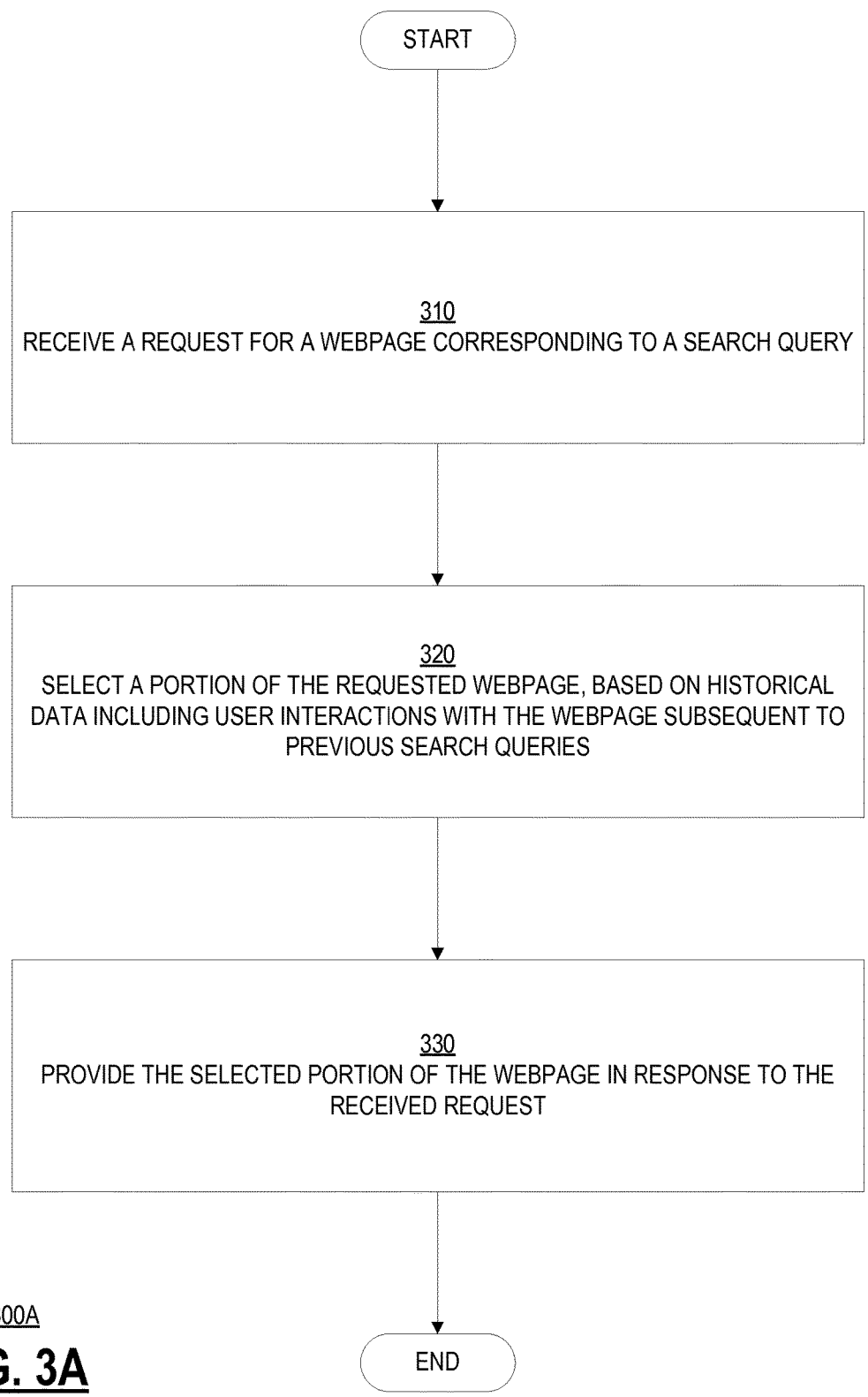
FIG. 3A illustrates an example of a process for providing a portion of a webpage.
Figure 3B:
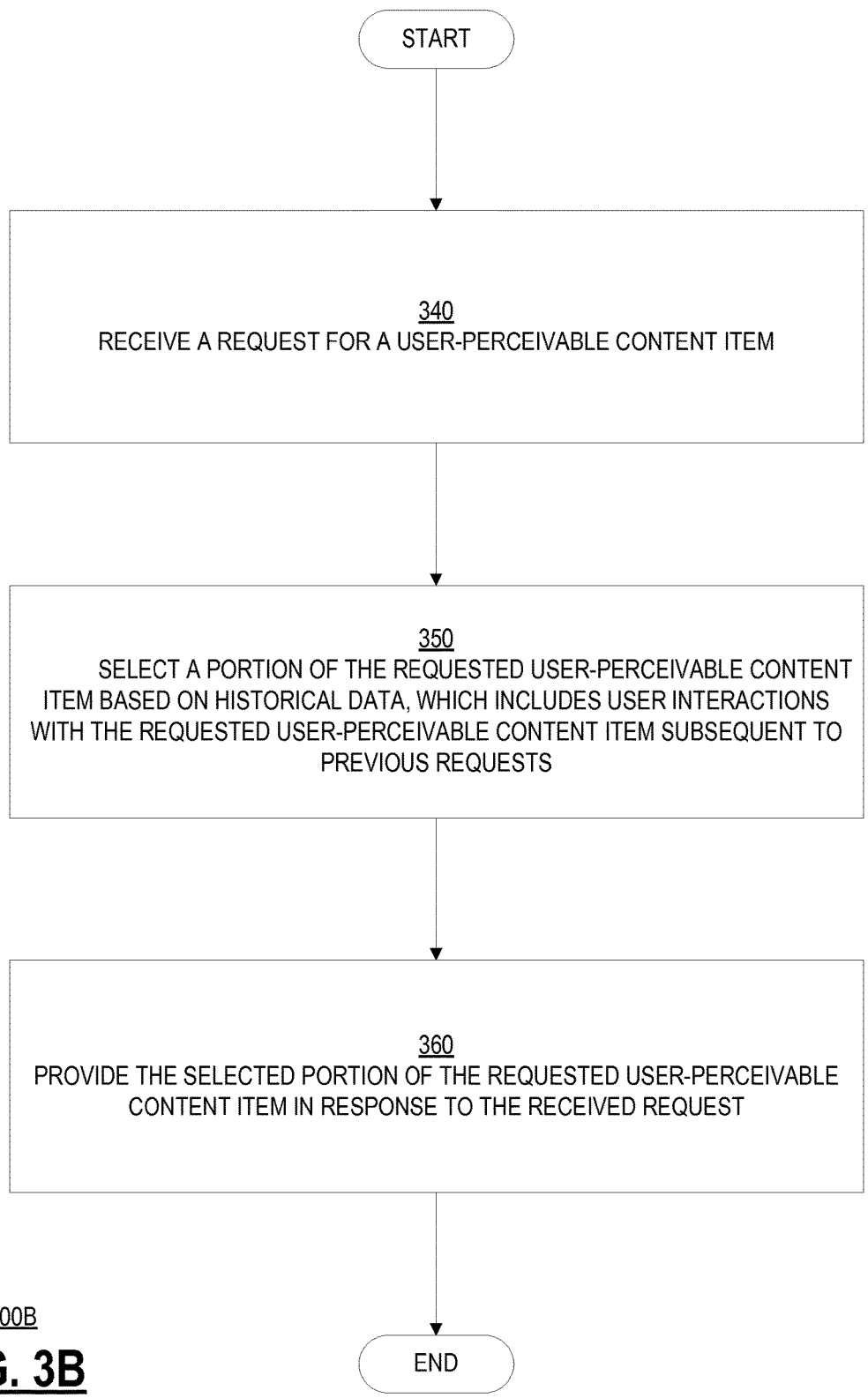
FIG. 3B illustrates an example of a process for providing a portion of a user-perceivable content item.
Figure 3C:
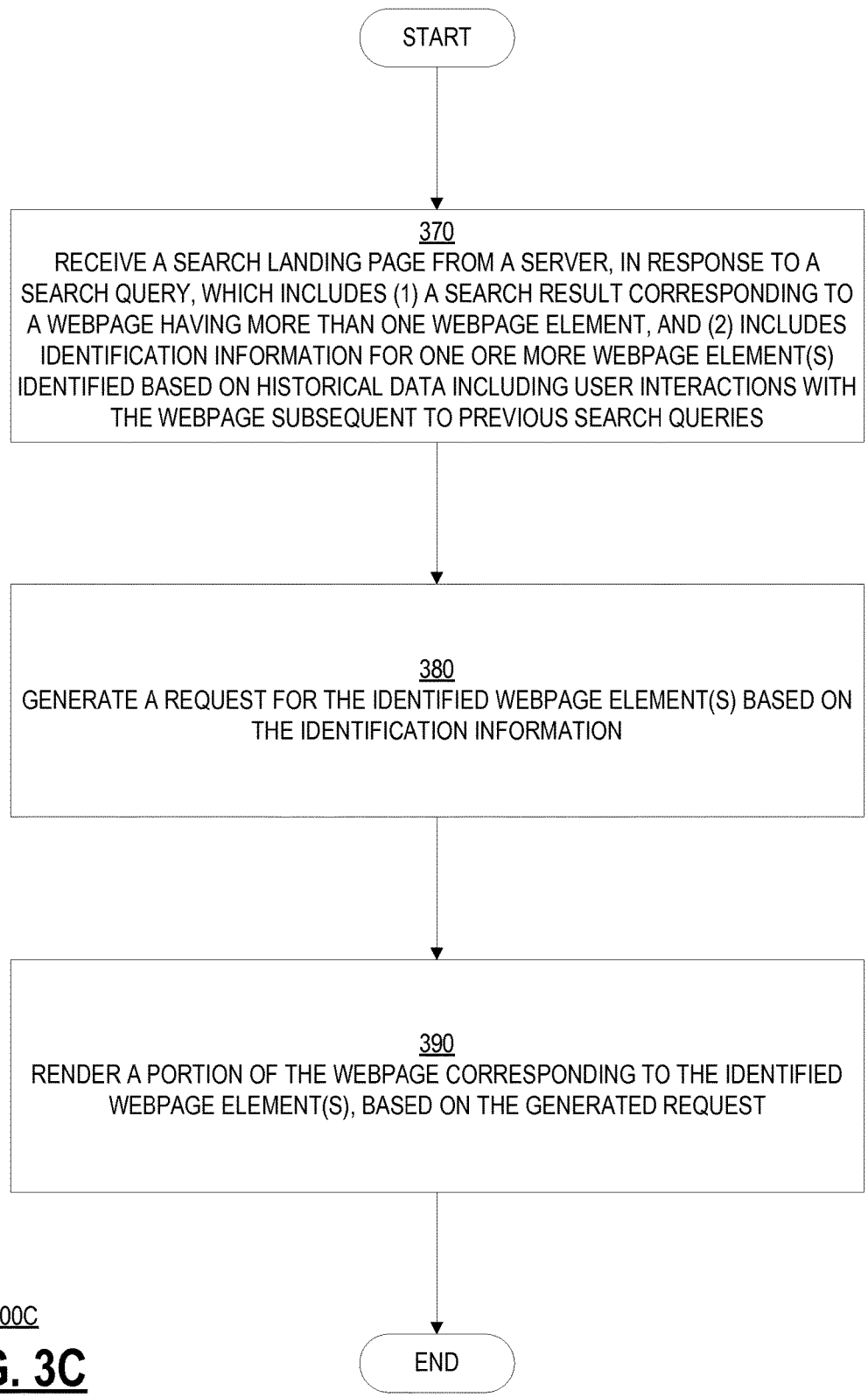
FIG. 3C illustrates an example of a process for rendering a portion of a webpage.

FIGS. 3A-3C illustrate examples of processes 300A-C for providing, or rendering, a portion of requested data based upon historical data 284 of the user's interaction with the requested data. It should be noted that although processes 300A-C are described herein with reference to the systems of FIGS. 1 and 2, processes 300A-C are not limited to such, and can be performed by other systems and/or configurations. Furthermore, it should be noted that while the examples of a webpage and a video are used to explain the processes 300A-C, the subject technology can apply to other forms of data as well.

FIG. 3A, which is explained with reference to FIGS. 4A-D, illustrates an example of a process 300A for providing a portion of a webpage, such as for example, webpage 410A.

Figure 4A:
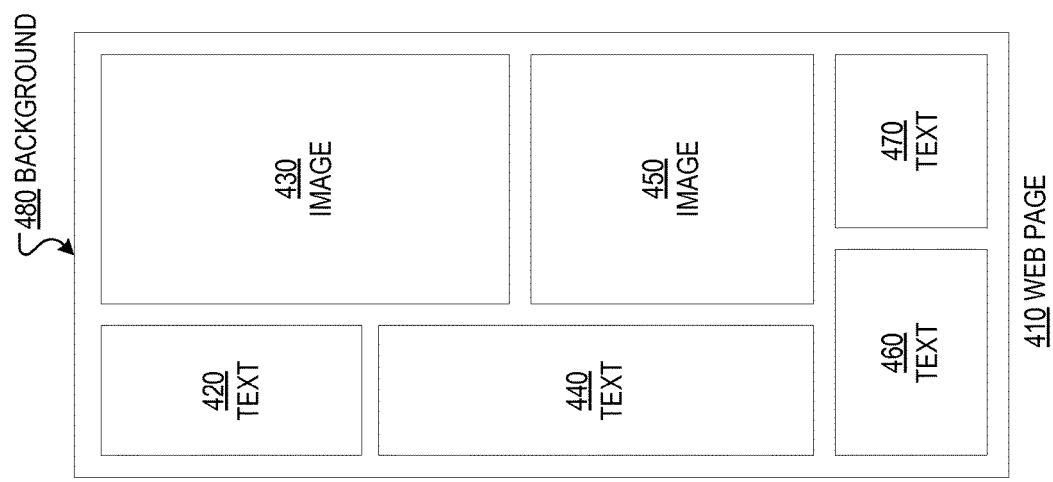

FIG. 4A illustrates a webpage 410. Webpage 410 includes webpage elements 420-480. Webpage elements 420, 440, 460, and 470 consist of text information. Webpage elements 430 and 450 are images. Webpage element 430 is a large, high-resolution, digital image. Webpage element 450 is a smaller sized digital image. Webpage element 480 is the background of the webpage 410.

Users reach webpage 410 as a result of various web searches. When users reach the webpage 410 based on a first search query, they often spend some time viewing the area of the webpage 410 that includes webpage elements 420 and 430. Subsequently, many users scroll past webpage elements 440 and 450 to view the area of the webpage 410 that includes webpage elements 460 and 470. Conversely, when users reach the webpage 410 as a result of a second search query, they scroll to the lower third of webpage element 430, and often zoom in. And, when users reach the webpage 410 as a result of a third search query, they save a copy of webpage elements 450 and 470. This, and other information relating to the webpage 410 is provided by the web browser 242 to the server 170, where it is stored as historical data 284.

In Step 310, the portioning module 282 receives a request, for a webpage corresponding to a search query. The request is received from a client computing device 110. The request is generated based upon a selection (e.g., by the user) of a search result that corresponds to the requested webpage.

Referring to FIG. 4A, when the server 170 receives a search query the same as or similar to the first search query, the server 170 can select specific portions of the webpage 410 which, based on historical data 284, other users interacted with subsequent to the first search query.

In Step 320, the portioning module 282 selects a portion of the requested webpage, based on historical data 284. The historical data 284 includes user interactions with the webpage subsequent to previous search queries. The user interactions can include clicking, highlighting, scrolling, or a pointer movement with respect to the selected portion of the webpage. For example, the user interaction of a user who previously submitted the same or similar search query, and reached the requested webpage, is considered. The user interaction can also include browsing away from the requested webpage after reaching it.

The requested webpage can have a number of webpage elements. Examples of webpage elements include text, audio, image and video data that is included in the webpage. For example, in a webpage with text (e.g., in a frame) and an image, the text and the image can be considered elements of that webpage. In selecting a portion of the requested webpage, the portioning module 282 can select one or more of the elements of that webpage.

Webpage elements can be broadly categorized as user-perceivable and non-user-perceivable. A user-perceivable webpage element is one that would be displayed as part of the webpage to a user. For example, text, image, and video files displayed as part of the webpage, and audio played as part of the webpage can be considered user-perceivable webpage elements.

Webpage elements such as source code, which is not typically displayed to a user, can be considered an example of a non-user-perceivable webpage element. In selecting the portion of the requested webpage, the portioning module 282 can select one or more user-perceivable webpage elements, one or more non-user-perceivable webpage elements, or a combination thereof.

The selection of the webpage elements can be based upon information in addition to the historical data 284. For example, the portioning module 282 can select webpage elements based on a connection speed of a client computing device 110 from which the request is received. Thus, in a case where the connection speed of a client computing device 110 is below a certain threshold, the portioning module 282 can select fewer, more relevant webpage elements. Similarly, in a case where the connection speed of the client computing device 110 is above that threshold, the portioning module 282 can select additional webpage elements.

As another example, the portioning module 282 can select webpage elements based on a geographic location of the client computing device 110 from which the request is received. Thus, in a case where a location is known to have slow connection speeds, or an expensive data connection, the portioning module 282 can select fewer, most relevant webpage elements. Similarly, in a case where the location is known to have fast connection speeds, or an inexpensive data connection, the portioning module 282 can select additional webpage elements.

FIGS. 4B-D illustrate various approaches to how a portion of a webpage e.g., 410 may be selected. In FIG. 4B, the selected portion includes webpage elements 420, 460, and 470 in their entirety. The selected portion further includes the top part of webpage element 430, and certain (unshaded) areas of the background 480. Webpage elements 440 and 450 are not included in the selected portion.

It should be noted that the selected portion of the webpage 410 is not at the beginning (e.g., top) or the end (e.g., bottom) of the webpage 410, and is not selected based purely on the data size of the selected webpage elements 420-480. Instead, the selected portion includes webpage elements, and parts of webpage elements that are selected based on historical data 284.

FIG. 4C illustrates another approach to selecting a portion of the webpage 410. In this example, only the bottom half of webpage element 430 is included in the selected portion. The top part of webpage element 430 is not included, and neither is any part of the background 480.

It should be noted that in this example, the selection portion does not include the entire cross section of the webpage 410, as it did in the selected portion of FIG. 4B.

FIG. 4D illustrates yet another approach to selecting a portion of the webpage 410. In this example, the selected portion includes webpage elements 450 and 470 in their entirety. No other webpage elements, including the background 480, are included in the selected portion.

The selected portions of FIGS. 4B-D can differ due to a variety of reasons. For example, the portion selected in FIG. 4B can be selected for a user who has reached the webpage 410 based on a search query which is the same as, or similar to, the first search query. Similarly, the portion selected in FIG. 4C can be selected for a user who reaches the webpage 410 based on a second search query, but appears to be using a mobile device with a slow network connection speed. The portion selected in FIG. 4D can be selected for a user who reaches the webpage 410 based on a third search query.

In Step 330, the selected portion of the requested webpage is provided in response to the received request for the webpage. After the selected portion of the selected webpage has been provided, a second portion of the requested webpage can be provided. For example, the second portion of the requested webpage can be provided in response to a second request. As another example, the second portion of the requested webpage can be provided after a time period. The duration of the time period can be determined based on a network connection speed of the client computing device 110 from which the requests are received.

Referring to FIG. 4B, the remainder of webpage element 430, the remainder of the background 480, and webpage elements 440 and 450 can be provided in response to a second request, or after a certain amount of time. Similarly, some or all of the previously unselected (shaded) portions of the webpage 410 in FIGS. 4C and 4D can be provided in response to a second request, or after a certain amount of time.

FIG. 3B, which is explained with reference to FIGS. 5A-C, illustrates an example of a process 300B for providing a portion of a user-perceivable content item, such as for example, a video 520 embedded in a webpage 510.

FIG. 5A illustrates a webpage 510 with a video 520 embedded therein. Video file 540 illustrates a conceptual visualization of the data size of the video 520. The video 520 has a duration of 25 minutes. The video 520 has been viewed by several users.

As the viewers begin viewing the video 520, they click on various locations on the progress bar 530 to skip to the part they are interested in. When users click to a location on the progress bar that is past the 12 minute mark, they often click to locations corresponding to earlier portions of the video. Upon reaching the 17 minute mark, many viewers stop watching the video. Others viewers fast forward the video starting at the 17 minute mark until they reach the 20 minute mark. This and other information relating to the video 520 is stored as historical data 284 on the server 170. Subsequently, when a request for the video 520 is received, the server 170 can select various portions of the video file 540 based on historical data 284.

In Step 340, a request for a user-perceivable content item is received. The request is received from a client computing device 110. The request can be generated based upon an operation (e.g., clicking, selecting) performed by a user. The request can be generated based upon software instructions executed on the client computing device 110.

A user-perceivable content item can include text, image, sound, or video data. A streaming video, a video file, a photograph, an e-book, and a music file, are examples of user-perceivable content items. The user-perceivable content item can be embedded within another electronic file (e.g., a webpage) or can be a stand-alone content item (e.g., a video file stored on a network share).

Referring to FIGS. 5A-C, when the webpage 510 is loaded, a request for the video 520 is automatically sent to the server 170.

In Step 350, a portion of the requested user-perceivable content item is selected based on historical data 284. The historical data 284 includes user interactions with the requested user-perceivable content item subsequent to previous requests. The user interactions can include clicking, highlighting, scrolling, a pointer movement with respect to the selected portion of the content item, and moving within the content item to locate the selected portion e.g., by forwarding, rewinding, pausing, and so on.

With respect to the example of FIG. 5A, one example of a selection of a portion of the video 520 is illustrated in FIG. 5B. It should be noted that the selected portion of the video file 540 does not correspond to the beginning or the end of the video 520. Rather, an intermediate section of the video file 540 which including minutes 12 through 17 of the video 520, is selected based on user interactions stored as historical data 284 on the server 170.

FIG. 5C illustrates another approach to selecting a portion of the video file 540. In this example, the first two minutes are selected in addition to minutes 12 through 17 of the video 520.

The selected portions of FIGS. 5B-C can differ due to a variety of reasons. For example, the portion selected in FIG. 5B can be selected for a user who is using a mobile device with a slow network connection speed. The portion selected in FIG. 5C can be selected for a user who appears to be using a mobile device with a fast (e.g., LTE) network connection.

In Step 360, the selected portion of the requested user-perceivable content item is provided in response to the received request for the user-perceivable content item.

In some implementations, the data size of the selected portion of the user-perceivable content item can be reduced. The extent to which the data size is reduced can be based upon a network connection speed of the client computing device 110 from which the request is received. The data size reduction can include downsampling or compressing the selected portion of the user perceivable content item. For example, referring to FIGS. 5A-C, the portions of the video that are selected can be downsampled or compressed to further reduce their data size.

After the selected portion of the user-perceivable content item has been provided, a second portion of the requested user-perceivable content item can be provided. For example, the second portion of the requested user-perceivable content item can be provided in response to a second request. As another example, the second portion of the requested user-perceivable content item can be provided after a time period. The duration of the time period can be determined based on a network connection speed of the client computing device 110 from which the requests are received. Referring to FIGS. 5A-C, the server 170 can first provide portions of the video file 540 that include minutes 12 through 17 of the video 520, followed by the portion including the first two minutes of the video 520, or the remainder of the video 520.

FIG. 3C, which is explained with reference to FIGS. 4A-D, illustrates an example of a process 300C for rendering a portion of a webpage, such as for example, webpage 410A.

In Step 370, a client computing device 110 receives a search landing page from a server 170, in response to a search query. The received search landing page is generated by the server 170. The received search landing page includes at least one search result that corresponds to a webpage. The webpage includes a number of webpage elements, which as explained above with respect to Step 320, can include text, audio, image, and video data.

The received search landing page includes information identifying one or more of the webpage elements. For example, the search page can include a listing of links to the webpage elements. As another example, the search page can include instructions executable by the client computing device 110 to request specific webpage elements. The instructions can also be made part of the search result's link that points to the webpage.

The webpage element(s) identified in the received search landing page are identified based on historical data 284. The historical data 284 includes user interactions with the webpage subsequent to previous search results. User interactions can include, highlighting, scrolling, or a pointer movement with respect to a particular webpage element. For example, the user interaction of a user who previously submitted the same or similar search query, and reached the requested webpage, is considered. The user interaction can also include browsing away from the requested webpage after reaching it.

The webpage element(s) can be identified based on information in addition to historical data 284. For example, the server 170 can identify webpage elements based on a connection speed of the client computing device 110. Thus, in a case where the connection speed of the client computing device 110 is below a certain threshold, the server 170 can identify fewer, most relevant webpage elements. Similarly, in a case where the connection speed of the client computing device 110 is above that threshold, the server 170 can identify additional webpage elements.

As another example, the server 170 can identify webpage elements based on a geographic location of the client computing device 110. Thus, in a case where a location is known to have slow connection speeds, or an expensive data connection, server 170 can select fewer, most relevant webpage elements. Similarly, in a case where the location is known to have fast connection speeds, or an inexpensive data connection, the server 170 can select additional webpage elements.

Referring to FIG. 4A, one or more of the webpage elements 420-480 of the webpage 410 can be identified for the client computing device 110 to request and render for display.

In Step 380, the client computing device 110 generates a request for the webpage element(s) identified with respect to a particular search result. For example, when the user clicks or otherwise selects a search results, the client computing device 110 generates a request for the webpage elements identified by the server 170 based on historical data 284.

Referring to FIG. 4A, the client computing device 110 can generate a request for certain webpage elements identified by or in the received search landing page. For example, the client computing device 110 can request webpage elements 450 and 470.

In Step 390, the client computing device 110 renders a portion of the webpage that corresponds to the requested webpage elements identified by the server 170.

Referring to FIG. 4D, the client computing device 110 can render the requested webpage elements 450 and 470 as illustrated in FIG. 4D. To the extent that a server 170 supports providing portions such as those illustrated in FIGS. 4B and 4C, the client computing device 110 can request such portions as well.

Figure 6:
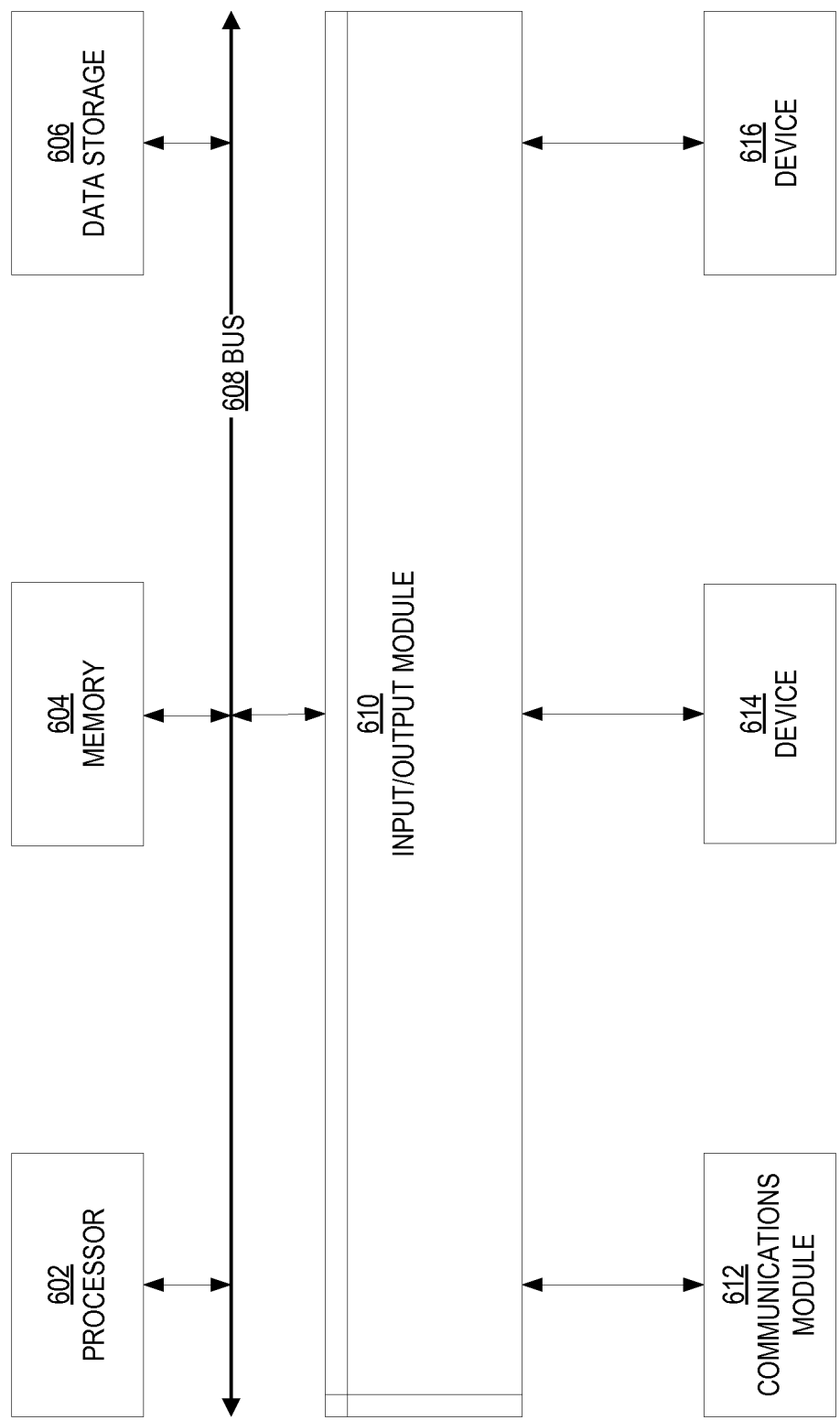
FIG. 6 conceptually illustrates an electronic system with which some aspects of the subject technology can be implemented.

FIG. 6 conceptually illustrates an electronic system with which some aspects of the subject technology can be implemented. For example, FIG. 5 illustrates an example of a computer system 600 with which the client computing device 110 or the server 170 of FIG. 2 can be implemented. In certain aspects, the computer system 600 may be implemented using hardware or a combination of software and hardware, either in a dedicated server, or integrated into another entity, or distributed across multiple entities.

Computer system 600 (e.g., client computing device 110, server 170) includes a bus 608 or other communication mechanism for communicating information, and a processor 602 (e.g., processor 220, processor 260) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk, optical disk, or solid state disk coupled to bus 608 for storing information and instructions. Computer system 600 may be coupled via input/output module 610 to various devices. The input/output module 610 can be any input/output module. Examples of input/output modules 610 include data ports such as USB ports. The input/output module 610 is configured to connect to a communications module 612. Examples of communications modules 612 (e.g., communications module 222, communications module 262) include networking interface cards, such as Ethernet cards and modems. In certain aspects, the input/output module 610 is configured to connect to a plurality of devices, such as an input device 614 (e.g., input device 202) and/or an output device 616 (e.g., output device 204). Examples of input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 616 include display devices, such as a CRT (cathode ray tube) or LCD (liquid crystal display) monitor, for displaying information to the user.

According to one aspect of the present disclosure, the client computing device 110 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include client computing devices and servers. A client computing device and server are generally remote from each other and typically interact through a communication network. The relationship of client computing device and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that include bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for providing search results, the method comprising:
   receiving a request for a webpage corresponding to a search query, wherein the request is received from a computing device, wherein the requested webpage comprises a plurality of webpage elements, and wherein at least one of the plurality of webpage elements is a user-perceivable webpage element;
   selecting a portion of the requested webpage to provide first, before other portions of the requested webpage, based on historical data comprising user interactions of a plurality of users with the selected portion of the requested webpage before the search query and subsequent to at least one previous search query, wherein the selected portion of the requested webpage comprises a subset of the plurality of webpage elements, and fewer web elements than the subset when a network connection speed associated with the computing device is below a first threshold; and
   providing, in response to the received request, the selected portion of the requested webpage.

2. The computer-implemented method of claim 1, wherein the selecting is based on a geographic location of the computing device.

3. The computer-implemented method of claim 1, wherein the user interactions comprise at least one of a clicking, highlighting, scrolling, or a pointer movement with respect to the selected portion of the requested webpage.

4. The computer-implemented method of claim 3, wherein the user interactions further comprise browsing away from the requested webpage.

5. The computer-implemented method of claim 1, wherein the selected portion of the requested webpage comprises at least one user-perceivable webpage element.

6. The computer-implemented method of claim 1, wherein the selected portion of the requested webpage comprises at least one non-user-perceivable webpage element.

7. The computer-implemented method of claim 1, further comprising:
   selecting additional web elements when the network connection speed is above a second threshold.

8. The computer-implemented method of claim 1, wherein the fewer web elements correspond to web elements determined to have higher relevance than other web elements in the subset.

9. The computer-implemented method of claim 1, wherein the user-perceivable webpage element is comprises at least one of text, image, sound, or video information.

10. The computer-implemented method of claim 1, further comprising:
    providing a second portion of the requested webpage, in response to a second request.

11. The computer-implemented method of claim 1, further comprising:
    providing a second portion of the requested webpage after a time period.

12. The computer-implemented method of claim 11, wherein the time period is determined based on the network connection speed associated with the computing device.

13. A non-transitory machine-readable storage medium comprising machine-readable instructions for causing a processor to execute a method for providing a user-perceivable content item, the method comprising:
    receiving, from a computing device, a request for a user-perceivable content item corresponding to a search query;
    selecting a portion of the requested user-perceivable content item to provide first, before other portions of the requested user-perceivable content item, based on the search query and historical data, wherein the historical data comprises user interactions of a plurality of users with the selected portion of the requested user-perceivable content item before the search query and subsequent to at least one previous search query;

reducing a data size of the selected portion of the user-perceivable content item based on a network connection speed associated with the computing device from which the request is received;

providing, in response to the received request, the selected portion of the requested user-perceivable content item; and providing a second portion of the user-perceivable content item after a time period, wherein the time period is determined based on the network connection speed associated with the computing device.

14. The machine-readable storage medium of claim 13, wherein the user-perceivable content item comprises at least one of text, image, sound, or video information.

15. The machine-readable storage medium of claim 13, wherein the reducing comprises at least one of a downsampling or a compression of the selected portion of the user-perceivable content item.

16. A system for rendering a webpage corresponding to a search result, the system comprising:

a memory containing instructions for rendering a webpage corresponding to a search result;

a processor configured to execute the instructions to:

receive a search landing page from a server, in response to a search query, wherein the received search landing page comprises a search result corresponding to a webpage comprising a plurality of webpage elements;

identify a subset of the plurality of webpage elements to request first, before other elements of the webpage based on historical data comprising user interactions of a plurality of users with at least one element of the subset before the search query and subsequent to at least one previous search query, and wherein fewer web elements than the subset are identified when a network speed associated with the system is below a first threshold;

generate a request for the subset of the plurality of webpage elements, wherein the plurality of webpage elements are user-perceivable webpage elements; and render, based on the generated request, a portion of the received webpage corresponding to the subset of the plurality of webpage elements, or a portion of the received webpage corresponding to the fewer web elements than the subset when the network speed associated with the system is below the first threshold.

17. The system of claim 16, wherein the at least one of the plurality of webpage elements is identified based on a geographic location of the system.

* * * * *